United States Patent [19]
Nonnweiler et al.

[11] Patent Number: 5,347,590
[45] Date of Patent: Sep. 13, 1994

[54] SPATIAL FILTER FOR AN IMAGE PROCESSING SYSTEM

[75] Inventors: Edward D. Nonnweiler, Milwaukee; David L. McDaniel, Dousman, both of Wis.

[73] Assignee: General Electric Company, Milwaukee, Wis.

[21] Appl. No.: 712,764

[22] Filed: Jun. 10, 1991

[51] Int. Cl.5 .............................. G06K 9/00
[52] U.S. Cl. ........................ 382/6; 382/27; 382/54
[58] Field of Search ............ 382/6, 27, 31, 54; 364/724.05

[56] References Cited

U.S. PATENT DOCUMENTS

| | | | |
|---|---|---|---|
| 4,328,425 | 5/1982 | Stoffel | 250/578 |
| 4,393,402 | 7/1983 | Keyes et al. | 358/111 |
| 4,499,493 | 2/1985 | Nishimura | 358/111 |
| 4,504,908 | 3/1985 | Riederer et al. | 364/414 |
| 4,736,448 | 4/1988 | Umemura | 382/54 |
| 4,817,180 | 3/1989 | Cho et al. | 382/54 |
| 4,908,874 | 3/1990 | Gabriel | 382/41 |
| 4,941,191 | 7/1990 | Miller et al. | 382/54 |
| 4,984,286 | 1/1991 | Dolazza | 382/54 |
| 4,996,413 | 2/1991 | McDaniel et al. | 250/208.1 |
| 5,073,958 | 12/1991 | Imme | 382/22 |

FOREIGN PATENT DOCUMENTS

| | | |
|---|---|---|
| 0117154 | 2/1984 | European Pat. Off. |
| 0409310 | 7/1990 | European Pat. Off. |
| 61-248166 | 11/1986 | Japan |
| 62-217287 | 9/1987 | Japan |
| 63-294084 | 11/1988 | Japan |
| 3-119487 | 5/1991 | Japan |

Primary Examiner—David K. Moore
Assistant Examiner—Andrew W. Johns
Attorney, Agent, or Firm—Quarles & Brady

[57] ABSTRACT

An medical imaging system includes a photodetector array which converts an X-ray image into a series of picture elements arranged in rows and columns of a two dimensional matrix. The picture elements are read from the array on a column by column basis. A spatial filter for the picture elements includes a first filter that applies one filter function to the pixels in each column of the image. The partially filtered pixels are stored in a first memory and then read therefrom row by row in a field interlaced order. The rows of picture elements are sent to a second filter that applies another filter function to each row. The fully filtered picture elements from the second filter either are stored or converted to a video signal for display.

10 Claims, 2 Drawing Sheets

SPATIAL FILTER FOR AN IMAGE PROCESSING SYSTEM

BACKGROUND OF THE INVENTION

The present invention pertains to spatial filters for two dimensional arrays of data, and in particular to spatial filters for images, such as those produced by X-ray equipment.

Fluoroscopic imaging apparatus include a source for projecting an X-ray beam through an object to be examined, such as a medical patient. After the beam passes through the patient, an image intensifier converts the X-ray radiation into a visible light image from which a video camera produces an analog video signal for display on a monitor. The analog camera signal also can be digitized into a series of picture elements (pixels) for further processing and storage.

The digital pixels often are processed to clarify the image and enhance specific features of interest. A common enhancement technique processes the image with a two dimensional spatial filter. For this technique, a filtered value for each pixel is derived according to a defined arithmetic function from the value of that pixel and selected neighboring pixels. In order to apply that type of function, the pixels for the entire image must be sent to a filter pipeline in a progressive order, i.e. from one edge of the image to the opposite edge.

However, pixels are not obtained from most video cameras in a progressive order. A conventional video camera produces an image frame as two interlaced fields of rows of pixels. One field results from sequential scanning of only odd numbered rows, while the other field is produced by scanning the even pixel rows. Therefore, the field interlaced image has to be converted to a progressive scan for spatial filtering and then reconverted to an interlaced format for display on a standard monitor.

A previous spatial filter 10 for a two dimensional image is shown in FIG. 1. The field interlaced video signal from a camera is coupled to an analog-to-digital converter (ADC) 11 which produced a series of digital numbers representing the luminance of the pixels in the image. The digital pixels from the ADC 11 are stored temporarily in a first frame buffer 12 in the non-progressive order as received from the camera. The pixels are stored as a two dimensional array in which a given pixel is located in a row and a column of the array.

After the entire image frame has been stored, the pixels are read from the first frame buffer 12 in a progressive order from one image edge to another (e.g. from top to bottom) and applied to a two dimensional spatial filter circuit 13. A common spatial filter circuit 13 applies a Gaussian filter function $G(r,c)$, where r is the row location and c is the column location of the pixels in the image. This type of filter determines a new value for each pixel by averaging its luminance with that of its neighbors in a Gaussian weighed manner. The filtered pixels then are stored in a second frame buffer 14 in order to convert the progressive output from the filter 13 into a standard video format. After an entire frame of pixels has been stored, the image is read from the second frame buffer 14 row by row in a field interlaced manner. The filtered pixels are sent to a video signal circuit 15 which produced a conventional video signal for displaying the enhanced image on a monitor.

The pair of frame buffers 12 and 14 delays the image for two frame scan intervals in order to convert the image to and from the progressive scan format required by the filter circuit 13. This delay, when added to the delay due to the two dimensional filter, can be objectionable to the user. For example, during real-time fluoroscopic examination, a perceptible time lag occurs between manipulation of a catheter within a patient and movement in the displayed image. Therefore, it is desirable to reduce the filtering delay as much as possible. In addition, requiring multiple frame buffers to store the image in the spatial filter adds to the cost of that component.

SUMMARY OF THE INVENTION

An X-ray diagnostic system includes a converter that transforms an X-ray image into a two dimensional matrix of picture elements arranged in rows and columns. A spatial filter for the picture elements has a means for receiving picture elements on a column by column basis. A first filter is connected to the means for receiving and applies a single dimension filter function to the columns of picture elements. The partially filtered picture elements from the first filter are stored in a memory.

The stored picture elements are read from the first memory in a row by row field interlaced manner and sent to a second filter. The second filter applies another single dimension filter function to the rows of picture elements read from the first memory to produce fully filtered picture elements. In one embodiment of the spatial filter, the fully filtered picture elements are fed directly to a circuit that generates a video signal from those picture elements.

In another embodiment of the present invention, the fully filtered picture elements are coupled to the address port of a look up table memory. A second memory stores unfiltered picture elements from the means for receiving. Both the look up table memory and the second memory are connected to a means for combining data from the two components to produce a series of resultant picture elements. A video signal is generated from the series of resultant picture elements. A multiplexer also may be provided to select either the series of resultant picture elements produced by the means for combining or data stored in the look up table memory from which to generate the video signal.

A general object of the present invention is to provide a spatial filter for a two dimensional array of data.

A more specific object is to provide such a filter for an image that minimizes the time delay required to process picture elements of the image.

Another object of the present invention is to reduce the number of frame memories required by the spatial filter.

A further object is to provide a two dimensional spatial filter that enables non-linear image enhancements.

DETAILED DESCRIPTION OF THE INVENTION

Figure 1:
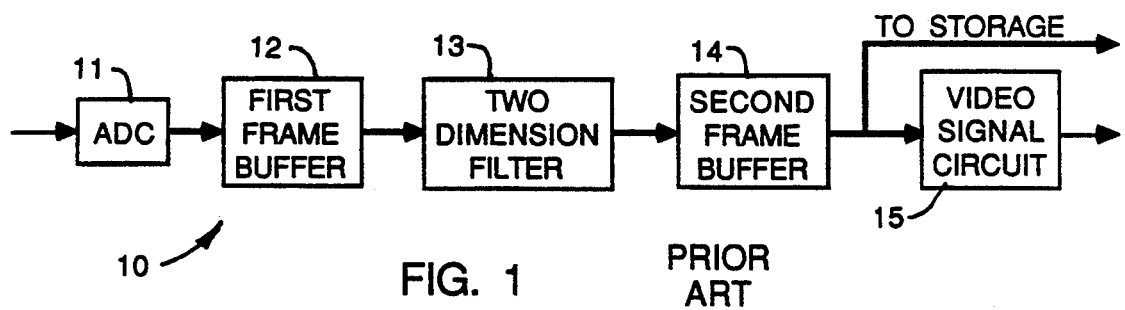
FIG. 1 is a block schematic diagram of a prior art two dimensional spatial filter.
Figure 2:
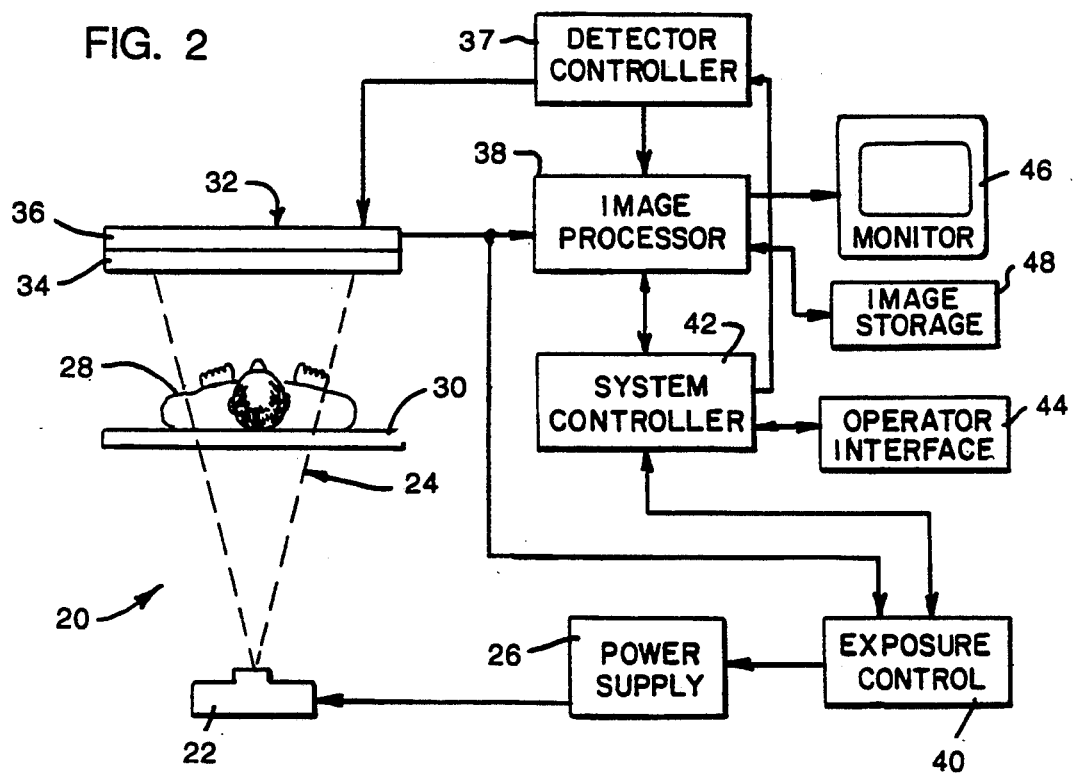
FIG. 2 depicts an X-ray imaging system having an image processor that includes a spatial filter.

With initial reference to FIG. 2, a medical imaging apparatus 20 includes an X-ray tube 22 which emits an X-ray beam 24 when excited by a power supply 26. As illustrated, the X-ray beam is directed toward a patient 28 lying on an X-ray transmissive table 30. A portion of the beam 24, which passes through the table and the patient, impinges upon an X-ray detector generally designated 32. The X-ray detector 32 comprises a scintillator 34 that converts the X-ray photons to lower energy photons in the visible spectrum and a photodetector array 36 which converts the light photons into an electrical signal.

The photodetector array 36 is a square, two dimensional matrix of a thousand or more photosensors in each row and column. Each photosensor produces one picture element (pixel) of the image and the photosensors are connected in such a way that the pixels are read column by column from the array 36. The pixels in each column are fed out sequentially from top to bottom or bottom to top. For faster pixel output, several columns of pixels may be read simultaneously from the array, in which case the columns are not read in a sequential order from one side to the other. The photodetector array 36 is similar to the ones described in U.S. Pat. No. 4,996,413, which is incorporated herein by reference. A detector controller 37 contains electronics for operating the photodetector array 36 to acquire an image and to read out the pixel signal from each photosensor element.

The image signal from the photodetector array 36 is applied to an exposure control circuit 40. The exposure control circuit uses the photodetector signal as an indicator of image brightness in order to regulate the power supply 26 and thereby the X-ray exposure. The operation of the exposure control circuit 40 and the detector controller 37 are governed by a system controller 42 which receives commands from the X-ray technician via an operator interface panel 44.

The image signal from the photodetector array 36 also is coupled to the image processor 38 that includes circuitry for enhancing the video image under direction from the system controller 42. For the present invention, the image processor 38 spatially filters the image, as will be described. The enhanced image is displayed on a field interlaced video monitor 46 and archived in a storage device 48.

Figure 3:
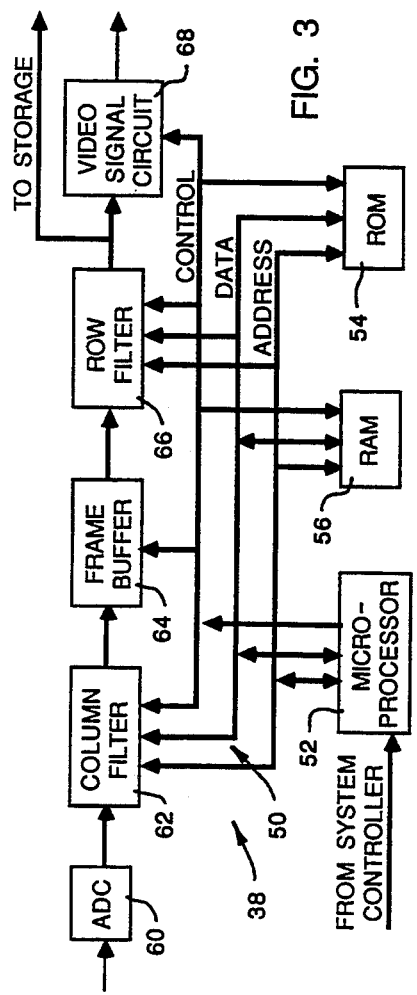
FIG. 3 is a block schematic diagram of one embodiment of an improved spatial filter.

FIG. 3 shows the details of a novel spatial filter that is contained within the image processor 38. A two-dimensional filter function $G(r,c)$ for an image can be written as the product of two orthogonal, single dimension filter functions, i.e. $G(r,c) = F(r) \times H(c)$, where r is the row location and c is the column location of pixels in the image. The row and column filter functions $F(r)$ and $H(c)$ can be performed by different circuits. This separation not only simplifies the circuitry of the filter as compared to a combined two-dimensional filter circuit, but the number of frame buffers can be reduced by pixel transmission and proper arrangement of the components. Thus one of the frame period delays inherent in previous filter designs has been eliminated.

With respect to the embodiment of an improved image processor filter shown in FIG. 3, the analog signal from the photodetector array 36 is applied to the input of an analog-to-digital converter (ADC) 60. The pixels are clocked out of the photodetector array 36 on a column by column basis and sequentially within each column. As with the prior devices, the analog signal level for each of the pixels clocked from the photodetector array is converted by the ADC 60 into a digital number for further processing.

The digital output of the ADC 60 is connected to the input of a column filter 62 which applies the single dimension filter function $H(c)$ to each column of pixels. For example, the column filter combines each pixel with a plurality of pixels above and below it in the column in a Gaussian weighted manner to derive a partially filtered pixel. Since the column filter 62 can apply the filter function $H(c)$ to the pixels regardless of the order in which each column is read from the photodetector array 36, it can receive the image data directly from the analog to digital converter without requiring a frame buffer as in the prior systems. As each pixel appears at the output of the column filter 62, it is stored in a frame buffer memory 64. The frame buffer used to implement the present invention may take several forms which allow pixels to be stored column by column and then read out row by row in an order defined by the video format of monitor 46.

As noted above, some photodetector arrays, such as those described in the aforementioned patent, can output several columns or several partial columns of pixels simultaneously. For these devices, the ADC 60 and column filter 62 have parallel paths for processing multiple pixel columns in unison. The frame buffer also is configured to store the parallel processed pixels.

Once every column of pixels in the image has been stored in the frame buffer 64, the partially filtered image is read therefrom a row at a time and applied to a row filter 66 which processes the image according to the filter function $F(r)$. For example, the row filter combines each pixel with a plurality of pixels on both sides of it in a Gaussian weighted manner to derive a fully filtered pixel. As with the column filter, the row filter 66 can process the rows of pixels in any order and the rows do not have to be progressive from top or bottom in the image. Therefore, the data is read from the frame buffer 64 in a field interlaced manner in which the odd rows of pixels are sequentially read out followed by the sequential reading of the even pixel rows. Thus, the image is read from the frame buffer 64 as required to produce a video signal for monitor 46. As each row of the image is read from the frame buffer 64, the row filter 66 applies the filter function $F(r)$ for that dimension of the image and then feeds the pixels to a video signal circuit 68 which converts the digital pixels into a standard analog video signal. Alternatively, the digital output from the row filter 66 can be fed to an image storage device 48 shown in FIG. 2.

The image processor 38 shown in FIG. 3 includes a microprocessor 52 and memory circuits 54 and 56 to control the filtering operation via a set 50 of data, address and control buses. The microprocessor 52 executes a control program stored in ROM 54 which produces control signals that control the flow of pixels through the filter from the ADC 60 to the video signal circuit 68. At system power up, the microprocessor 52 transfers the respective filter functions $H(c)$ and $F(r)$ from ROM 54 to configure the column and row filters 62 and 66. It should be noted that other mechanisms, such as a state machine, can be utilized in place of the microprocessor 52 to control the operation of the image filter.

Figure 4:
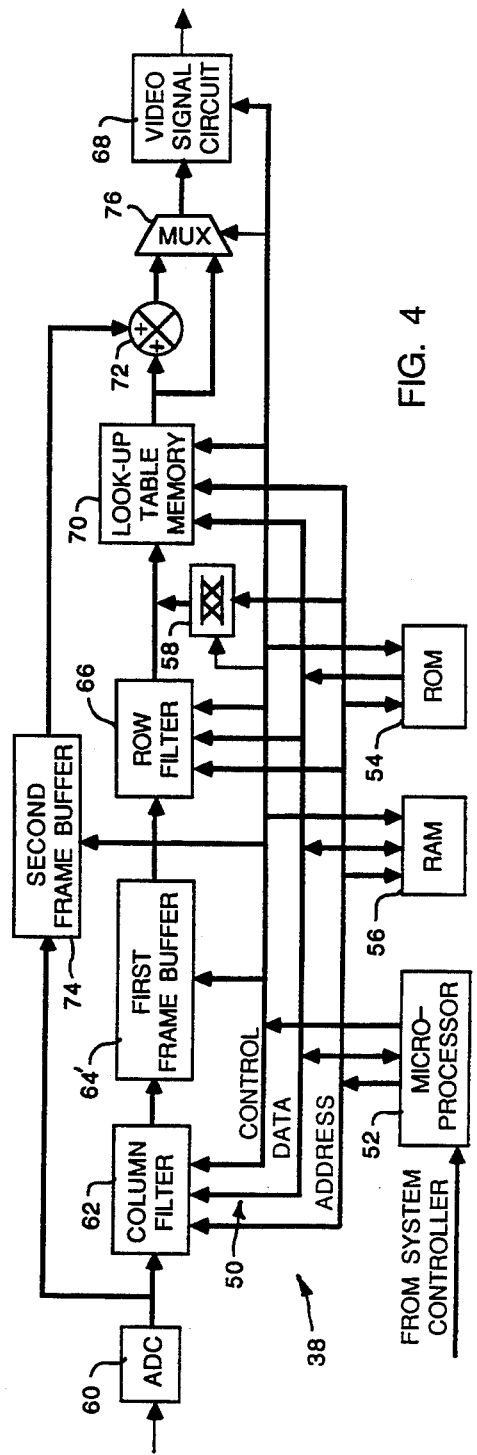
FIG. 4 is a block schematic diagram of another embodiment of a spatial filter according to the present invention.

The version of the improved spatial filter illustrated FIG. 4 not only provides the same filtering capabilities as the prior art two-dimensional filter, but also allows for non-linear image enhancements. With respect to this embodiment of the present invention, like components to those in FIG. 3 have been assigned identical reference numerals. The pixels from the photodetector array 36 are digitized by ADC 60 and fed to a column filter 62. As in the previous embodiment, this filter 62 applies the function H(c) for one dimension of the image and supplies the partially filtered pixels to a first frame buffer 64'. After a full image has been stored in the first frame buffer 64', the pixels are read out on a row by row basis in a field interlaced manner. The rows of pixels read from the first frame buffer 64' are fed through a row filter 66 which applies the filter function F(r) for the other dimension of the image to the pixels.

The output of the row filter 66 is coupled to the address input of a look up table memory 70. Fully-filtered pixels are used to address values in the table. The look up table stores conversion values which attenuate or amplify selected contrast ranges in the image. The microprocessor 52 stores the conversion values into the look up table memory 70 via a data buffer 58. A non-linear conversion relationship can be defined between the value of a filtered pixel that addresses the look up table memory and the value read out in response thereto. The value read from the look up table memory 70 is applied to one input of a digital adder 72.

A second frame buffer 74 stores the unfiltered image pixels received directly from the output of the ADC 60. The pixels are read from the second frame buffer 74 simultaneously in the same row by row order as they are read from the first frame buffer 64'. The output of the second frame buffer 74 is connected to another input of adder 72. The read out of pixels from the second frame buffer 74 is timed so the corresponding filtered and unfiltered pixels arrive at the adder 72 in synchronism. The adder 72 combines the values from the look up table memory 70 with the original image pixels to produce resultant pixels that has a non-linear relationship to the original image. The sign of the look up table value determines whether an original image pixel is attenuated or amplified.

The output from the adder 72 is applied to an input of a two-to-one multiplexer (MUX) 76. The other input of the multiplexer 76 is connected directly to the data output of the the look up table memory 70. The multiplexer 76 responds to a signal from the microprocessor 52 by selecting one of its inputs to apply to an output that is connected to the video signal circuit 68.

The embodiment of the present invention illustrated in FIG. 4 can be configured to operate in the same manner as the embodiment of FIG. 3. In this case, the values stored in each location of look up table memory 70 have the same value as the address of that location, i.e. a one to one correspondence between filtered pixel that addresses the memory and the memory output with no transformation taking place. The microprocessor 52 also instructs the multiplexer 76 to connect the output of the look up table memory 70 directly to the video signal circuit 68, thus providing the same image processing as that carried out by the FIG. 3 embodiment which does not include a look up table. Alternatively, a non-linear image enhancement function can be stored in the look up table memory 70 with its output being directly connected by multiplexer 76 to the video signal circuit 68 without being combined with the original image read from the second frame buffer 74. All of these configurations for the embodiment shown in FIG. 4 are implemented by the microprocessor 52 responding to control signals from the system controller 46 which in turn responds to commands entered by an X-ray technician into the operator interface 44.

We claim:

1. A spatial filter for a two dimensional image consisting of a plurality of picture elements arranged in rows and columns comprising:
    means for receiving picture elements on a column by column basis and sequentially within each column;
    first means for applying a first single dimension filter function to each column of picture elements received via a connection to said means for receiving;
    a first memory connected to said first means for applying a first single dimension filter function to store picture elements that have been processed by said first means;
    means for reading the stored picture elements from said first memory row by row in a field interlaced order; and
    second means for applying a second single dimension filter function to each row of picture elements read from said first memory.

2. The spatial filter as recited in claim 1 further comprising a means, connected to said second means for applying a second single dimension filter function, for generating a video signal from picture elements processed by said second means.

3. The spatial filter as recited in claim 1 further comprising a look up table memory having an address port and a data port, the address port being connected to receive picture elements processed by said second means for applying.

4. A spatial filter for a two dimensional image formed by a plurality of picture elements arranged in rows and columns comprising:
    means for receiving picture elements on a column by column basis and sequentially within each column;
    first means for applying a first single dimension filter function to each column of picture elements received via a connection to said means for receiving;
    a first memory connected to said first means for applying a first single dimension filter function to store picture elements that have been processed by said first means;
    means for reading the stored picture elements from said first memory row by row in a field interlaced order;
    second means for applying a second single dimension filter function to each row of picture elements read from said first memory;
    a look up table memory having an address port and a data port, the address port being connected to receive picture elements processed by said second means for applying;
    a second memory connected to store picture elements from said means for receiving; and
    means, coupled to said second memory and to said look up table memory, for combining a picture element read from said second memory with data received from the data port of said look up table memory to produce a resultant picture element.

5. The spatial filter as recited in claim 4 further comprising a means for generating a video signal from resultant picture elements received from said means for combining.

6. The spatial filter as recited in claim 4 further comprising a multiplexer having an input connected to the means for combining and another input connected to the data port of said look up table memory for selectively connecting one of the inputs to an output.

7. The spatial filter as recited in claim 6 further comprising a means coupled to the output of said multiplexer for generating a video signal.

8. The spatial filter as recited in claim 1 wherein said means for receiving receives picture elements from a plurality of columns simultaneously, and said first means applies the first single dimension filter function in parallel to each of the plurality of columns of picture elements.

9. An X-ray imaging system comprising:
means for generating a X-radiation;
a detector that responds to the X-radiation by producing a two dimensional image consisting of a plurality of picture elements arranged in rows and columns;
means for reading picture elements from said detector in column by column order;
a first means for filtering each column of picture elements received from said detector according to first filter function;
a first frame buffer connected to said first means for filtering to store picture elements that have been processed by said first means;
means for reading the stored picture elements from said first memory row by row in a field interlaced order;
a second means for filtering each row of picture elements received from said first frame buffer according to a second filter function to produce filtered picture elements; and
means for generating a video signal from filtered picture elements.

10. The system as recited in claim 9 further comprising a means transforming the filtered picture elements according to a non-linear function.

* * * * *